*J. Stratton,*
*Governor.*
Nº 26,210. Patented Nov. 22, 1859.
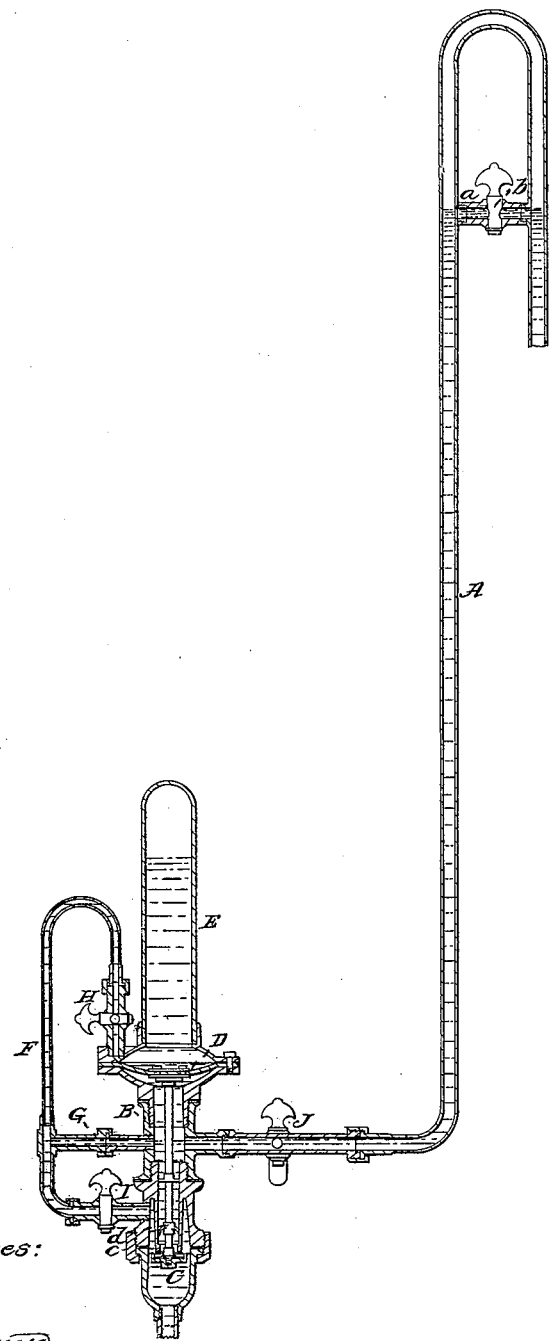
Witnesses:
Wm Tusch
R. S. Shmen
Inventor:
James Stratton

UNITED STATES PATENT OFFICE.

JAMES STRATTON, OF BROOKLYN, NEW YORK.

APPARATUS FOR REGULATING THE PRESSURE OF WATER IN PIPES.

Specification of Letters Patent No. 26,210, dated November 22, 1859.

*To all whom it may concern:*

Be it known that I, JAMES STRATTON, of Brooklyn, in the county of Kings and State of New York, have invented a new and useful Apparatus or Device for Regulating the Pressure of Water in Pipes; and I do hereby declare that the following is a full, clear, and exact description of the same, reference being had to the annexed drawing, making a part of this specification, said drawing being a vertical central section of my invention.

The object of this invention is to regulate the pressure of water in pipes so that the latter will not be subjected to any more pressure than is actually necessary to force the water the desired height, thereby guarding against the bursting or rupturing of the pipes and obviating the employment or use of those heavier and stronger than is necessary to sustain a pressure due to the required height of the column of water within them.

The invention is more especially designed to be applied in certain cases to water pipes which supply buildings in cities in which pipes, the water is not required to be forced up so high as the static pressure in the service pipe will admit of, as for instance, in the city of Brooklyn, which is supplied with water under a considerable head and subjects the pipes in low buildings to an unnecessary pressure.

The invention consists in the employment of an air-chamber provided with a plunger or yielding bottom to which a valve stem is attached, the air-chamber and valve being in connection with suitable pipes and in such relation with the supply pipe as hereinafter shown so as to effect the desired end.

To enable those skilled in the art to fully understand and construct my invention I will proceed to describe it.

A, represents a supply pipe which is placed within a building and extends up as high as the water is designed to be carried. This pipe A, may have branch pipes attached to carry the water to different apartments of a building as may be required, and the upper part of pipe A, is curved and bent down the upper bent portion being connected to the main part by a pipe *a*, provided with a cock *b*, as clearly shown in the drawing. The lower end of the pipe A, is attached to a pipe B, which has a valve C, within it, the stem of said valve being attached to an elastic diaphragm D, which forms the bottom of an air-chamber E, and divides the latter from the pipe B. The valve seat *c*, is at the lower end of a tube *d*, in the pipe B, and the air-chamber E, communicates with the pipe B, by means of a pipe F, the valve C, intervening between the lower end of pipe F, and the upper part of pipe B, as plainly shown in the drawing.

The pipe F communicates with the pipe B, at a point between the diaphragm D, and valve C, by a pipe G, and the latter pipe G, may be in line with the lower end of the supply pipe A. The pipe F, is provided with two cocks H, I, one H, being above the pipe G, and the other I, below it. The supply pipe A, is also provided with a cock J, near the pipe B. The pipe B, communicates at its lower end directly with the service pipe conected with the reservoir.

The operation of the invention is as follows:—Suppose for instance that the height of the head in the reservoir exceeds considerably the height to which the supply pipe A, is to carry the water in the building. The pipe A, is made a trifle higher than the water is to be elevated in the building and the cocks H, I, are opened, the valve C, being closed, and the water from the service pipe will pass up through the pipe F, into the air-chamber E, and through the pipe G, into the supply pipe A. When the water has reached a proper height in the pipe A, which may be indicated by the flow through pipe *a*, cock *b*, being open, the cocks H, I, and *b*, are closed and the compressed air in E, and the height of the column of water in A, will counterpoise, or nearly so the upward pressure against valve C, in the lower part of B, as the gravity of the water in A, acts against the pressure in E. When therefore any water is drawn from A, through cock J, or at any other point the equilibrium on the valve C, is destroyed, the pressure in E, preponderating and the compressed air in E, overcomes the pressure against valve C, and said valve opens in consequence of its connection to the elastic diaphragm D, and allows the water from the service pipe to pass up into A, at a height sufficient to nearly equilibrate as before the pressure on the upper and lower surface of valve C. In case the valve C, should stick so as not to close, the water may escape through the upper end of pipe A, and thereby prevent any excess of pressure in said pipe A. Thus it will be seen that the pressure in A, may be regulated as desired or according to the height of the column of water required without reference to the height of the head in the reservoir or the pressure of the water in the service pipe.

It will be understood that the water in A, acts with a great pressure against the under side of the diaphragm D, the arrangement being simply a development of what is known as the "hydrostatic paradox" and consequently if only a small portion of water be drawn from A, a sensible diminution of pressure is taken from below B, and as the area of D, considerably exceeds that of valve C, the condensed air in E, overcomes the static pressure against said valve C, and the later is opened and water from the service pipe permitted to pass through it into A, until, as before stated, the height of the column of water in A, is sufficient to counterpoise the pressure of air in E.

Having thus described my invention what I claim as new and desire to secure by Letters Patent, is,

The employment or use of the air-chamber E, diaphragm D, or its equivalent with valve C, attached, the pipe B, containing valve C, and communicating with the air chamber by pipe F, provided with the cocks H, I, and the pipe G, communicating with the pipe F, and B, the above parts being arranged in relation with each other and the supply pipe A, to operate as and for the purpose set forth.

JAMES STRATTON.

Witnesses:
WM. TUSCH,
R. S. SPENCER.